United States Patent [19]

Adams et al.

[11] 4,017,201
[45] Apr. 12, 1977

[54] MEANS FOR RENOVATING WORN CYLINDRICAL BEARING SURFACES

[75] Inventors: Claude L. Adams, Lakewood; Sergio Flores, Redondo Beach, both of Calif.

[73] Assignee: Flowers Tool Inc., South Gate, Calif.

[22] Filed: Sept. 15, 1975

[21] Appl. No.: 613,335

[52] U.S. Cl. .............................. 408/82; 29/401 F; 144/205; 408/111
[51] Int. Cl.[2] .................. B23B 41/12; B23B 47/18
[58] Field of Search .................. 408/69, 72, 81, 82, 408/111, 136; 24/401 R, 401 F; 144/205; 82/4 C

[56] References Cited

UNITED STATES PATENTS

| 714,631 | 11/1902 | Barnes ................................ 408/82 |
| 1,373,856 | 4/1921 | Bosch ................................. 408/82 |
| 1,493,142 | 5/1924 | Bodmer .............................. 408/136 |
| 2,537,916 | 1/1951 | Rosenboom ....................... 144/205 |
| 3,828,756 | 8/1974 | Kameraad et al. ............... 29/401 X |

Primary Examiner—Othell M. Simpson
Assistant Examiner—Z. R. Bilinsky
Attorney, Agent, or Firm—D. Gordon Angus; Donald D. Mon

[57] ABSTRACT

A cutting head adapted to be manually operated is positioned in relation to a worn bearing so that when the cutting head is rotated with pressure applied in the axial direction against the bearing. The head advances axially along the bearing while rotating and shaves or machines away the worn bearing surface so that a new sleeve may be fitted over the machined surface to provide a new bearing surface of the same diameter and position as the original bearing surface prior to its wearing. In one form the cutting tool is mounted on a spindle inserted into the hollow of the bearing for machining an exterior bearing surface. In another embodiment, the cutting head is on a shaft inserted through the bearing for centering the head. In still another embodiment the cutting head is arranged to advance within a hollow bearing to machine an inside bearing surface. In all embodiments provision is made for stopping the advancement of the cutting head when the proper axial length of bearing surface has been machined.

1 Claim, 7 Drawing Figures

U.S. Patent  April 12, 1977  Sheet 1 of 2  4,017,201
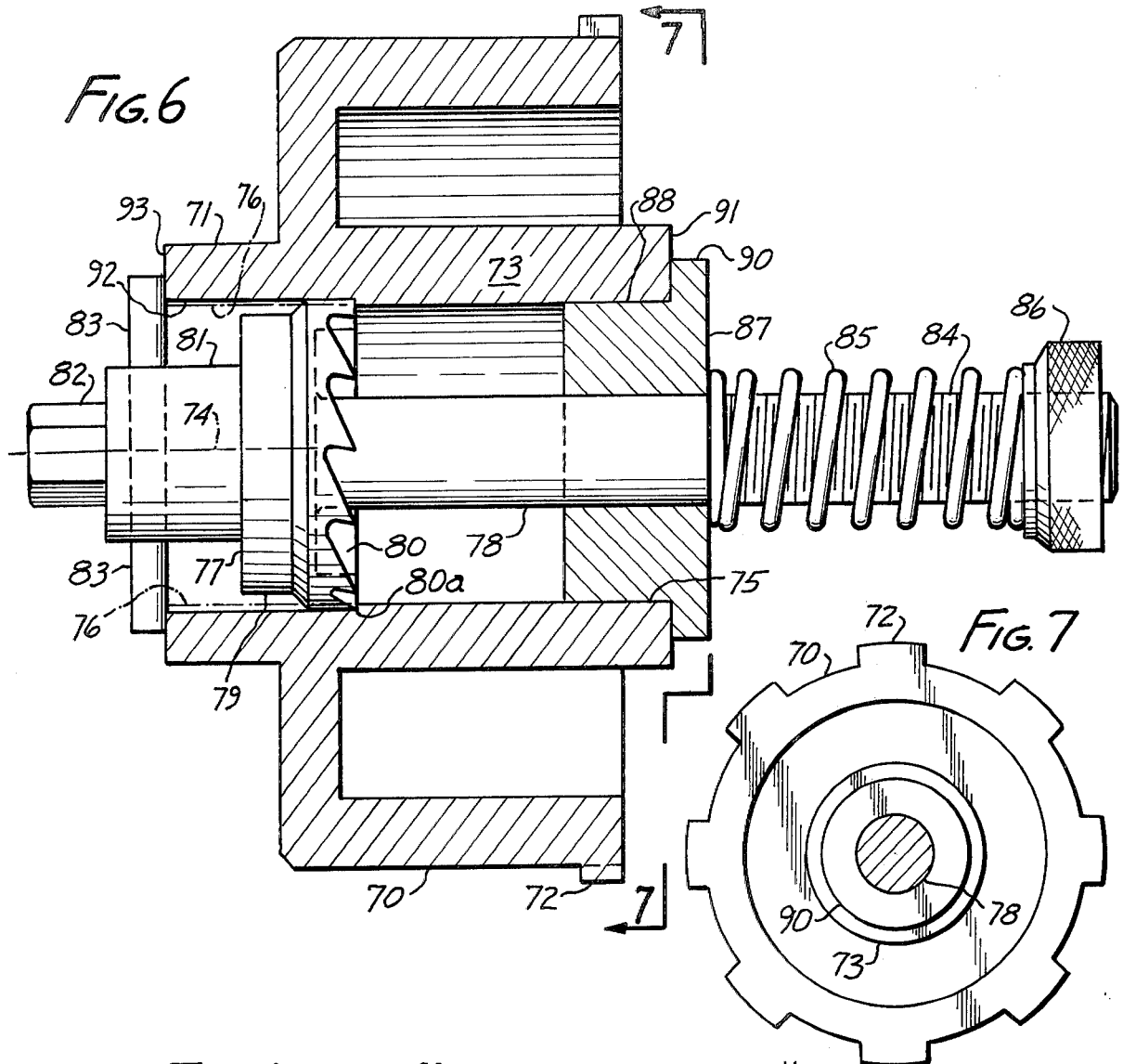
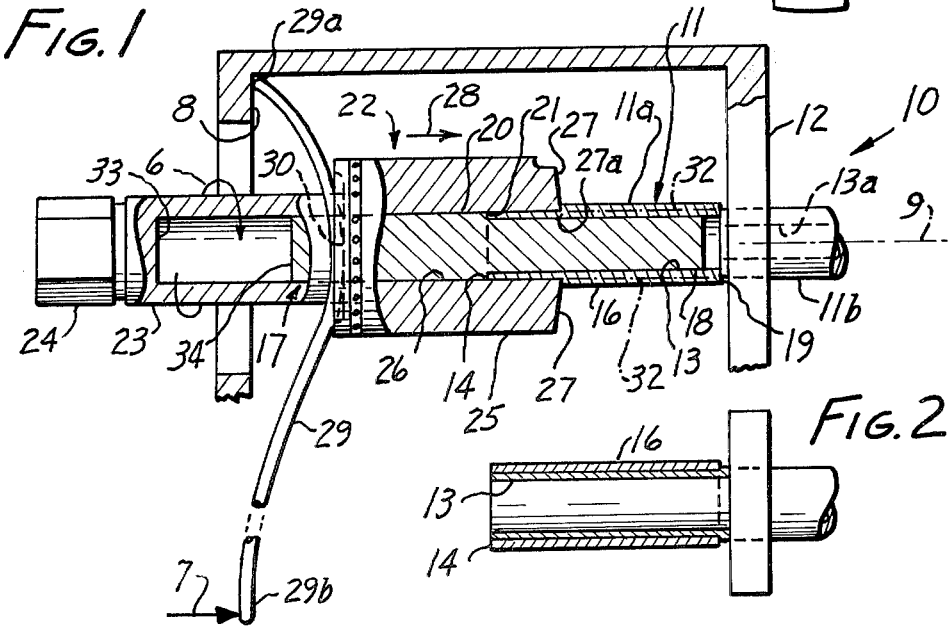

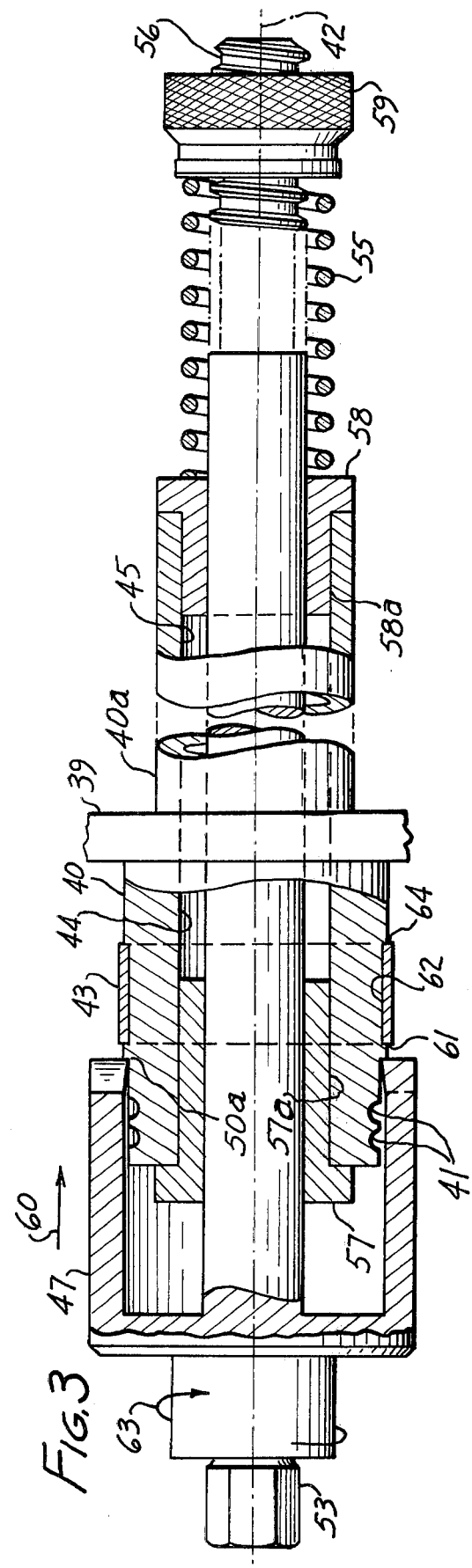
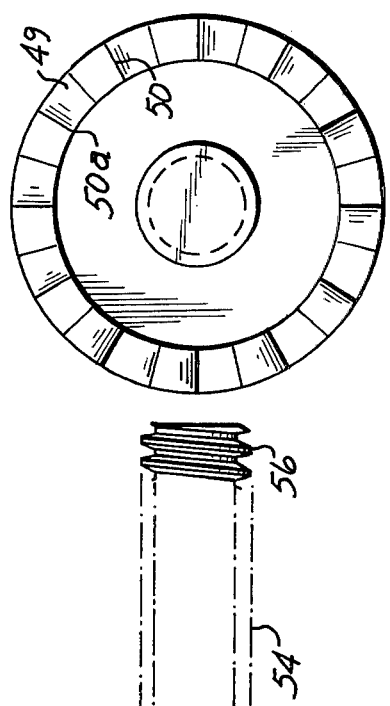
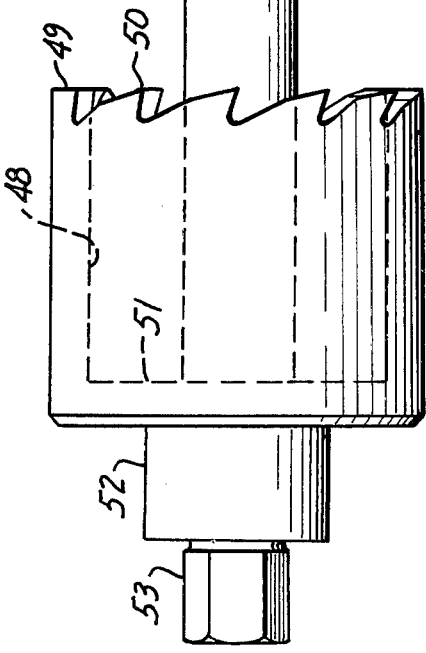

MEANS FOR RENOVATING WORN CYLINDRICAL BEARING SURFACES

This invention relates to means and method for renovating cylindrical bearings.

It is well-known for a shaft to rotate within a cylindrical bearing and for a wheel or wheel-like element having a hub provided with a bearing surface to rotate on, or relative to, a shaft. Such bearings commonly become scored or otherwise worn by long-continued use causing relatively rotating parts to wobble. Such wobbling can interfere with proper performance of equipment related to such bearings.

A typical example of the use of cylindrical bearings in equipment having relatively rotating members is an automatic transmission system of a motor vehicle. Such automatic transmissions commonly comprise both outer and inner cylindrical bearing surfaces subject to undesirable wear, which can cause wobble and malfunction of the transmission.

It has heretofore been the usual practice to disassemble the transmission and remove the parts of bearings containing wear, by a machining operation involving the use of a power-operated machine. Such machines are ordinarily found only in relatively large machine shops as they are usually too expensive to install in small shops.

An object of the present invention is to provide a method, and equipment for practicing the method for renovating worn bearings, which is relatively simple and inexpensive.

A related object is to permit the manual performance of machining operations for renovating worn bearings.

The invention is carried out by mounting a rotatable cutting head having cutting edges in relation to the worn bearing so that the cutting edges describe a circle in the bearing and when the cutting head is advanced axially along the bearing it machines a cylindrical surface of lesser diameter than the original bearing surface. Means is provided for urging the head to advance axially relative to the bearing while the bearing is being rotated. Such means may comprise a spring. A feature of the invention resides in provision of means related to the cutting head to prevent further longitudinal movement of the head after a desired axial length of the bearing has been machined in this manner. Thus, the axial length of the cylindrical surface thus machined can be made to correspond with the length of a bearing sleeve which may then be fitted to the machined cylindrical surface so that the cylindrical surface of the sleeve opposite that fitted to the machined bearing will constitute a new bearing surface of the same diameter as the original bearing surface.

In one aspect of the invention a bearing which may have a worn exterior bearing surface is machined by a cutting head with cutting edges extending inwardly toward the axis of the bearing, in which case the cutting head may be rotated on a pin which extends into a hollow of the bearing shaft.

In another aspect of the invention the worn bearing surface may be an exterior surface mounted on a hollow bearing shaft, in which case the cutting head may be mounted on a shaft rotatable within the hollow of the bearing shaft.

In another aspect of the invention the worn bearing may be an internal bearing providing for rotation relative to a shaft within it. Such a worn bearing may be machined by a cutting head mounted on a shaft and having cutting edges extending outwardly.

Terms such as "machining" or "machining of a worn bearing" as used herein signify the process of advancing the cutting head in the axial direction along the bearing while rotating the head to form a new cylindrical surface from which the worn bearing areas are removed. It should be understood that the rotation and advancement of the cutting head need not be done by any power tools or machinery but may be done by manually turning the cutting head while urging it in the axial direction as by spring action.

The foregoing and other features of the invention will be better understood from the following detailed description and the accompanying drawings of which:

FIG. 1 is an elevation view, partly in cross-section, showing a worn bearing on a piece of equipment, the worn bearing surface being machined by the use of manually operable tooling according to this invention;

FIG. 2 is a detail view in cross-section showing the machined bearing renovated by application to it of a bearing sleeve;

FIG. 3 is an elevation view, partially in cross-section, showing another form of manually operable tooling according to this invention in the process of removing worn areas from a bearing;

FIG. 4 is an elevation view of the cutting tool shown in FIG. 3;

FIG. 5 is an end view of the cutting tool of FIG. 4, showing the cutting teeth;

FIG. 6 is an elevation view, partly in cross-section, showing another form of cutting tool according to this invention shown in the process, which may be performed manually of removing worn areas of a hollow bearing; and FIG. 7 is a cross-section view taken at line 7—7 of FIG. 6.

FIG. 1 shows a part 10 of a mechanism which may be assumed to be a part of an automatic transmission for a motor vehicle. This part comprises a hollow tubular shaft 11 to which is fixed a component 12 of the mechanism. Although this component 12 is represented as comprising a plate-like member, it should be understood that it will ordinarily be in the form of a more complex mechanical element, as where it constitutes a component of an automatic transmission. The tubular shaft 11 has an inner cylindrical wall 13 coaxial with the axis 9 of the shaft. Its outer cylindrical wall is also cylindrical and comprises a bearing surface 11a as where used in an automatic transmission. At the side of component 12 opposite that of attachment of the tubular shaft 11 there is an extension 11b of the shaft as is commonly provided in such mechanisms. The end 14 of shaft 11 which is remote from element 12 is open, permitting entrance into the interior of the shaft.

It is assumed that the structure of FIGS. 1 and 2 is to be assembled with other mechanical structures to form the desired mechanical product which in this case may be assumed to be the automatic transmission. Such a structure related to shaft 11 will have a surface designed to engage the exterior bearing surface 11a and after the equipment is in use for a period of time the bearing action may cause the bearing surface 11a to wear down causing undesired wobble of the equipment.

According to the present invention means and method are provided for renovating the worn bearing surface, as will now appear. This is done by shaving down, or machining, the outer surface 11a of shaft 11 to form a cylindrical surface of a diameter somewhat smaller than the original exterior diameter of the shaft, but sufficiently larger than the inside diameter 13 to leave ample strength of the remaining material of the shaft. Then a cylindrical tubular sleeve 16 such as is best shown in FIG. 2 is forced over the shaft 11, now reduced in its exterior diameter. The inner diameter of sleeve 16 is such that it can be fitted over the machined shaft 11 by a press fit, and the outside diameter of sleeve 16 is the same as the original diameter of bearing surface 11a, so that when the sleeve is press-fitted over the machined shaft 11, the exterior bearing surface of this shaft is in effect returned to its original diameter but in a smooth and unworn condition like the original bearing surface prior to its being put into use.

The means for performing this renovating operation comprises a spindle 17. At one end it has a solid cylindrical section 18 with an outside diameter equal to the inside diameter 13a of shaft extension 11b, such that section 18 can be inserted through the opening 14 of shaft 11 and slid towards the element 12. At the end of section 18 remote from end 19 the spindle 17 is provided with a solid cylindrical section 20 of greater diameter than that of section 18, thereby forming a shoulder 21 where section 20 joins section 18.

In performing the renovating operation, the spindle 17 will be inserted into the tubular shaft 11 until the shoulder 21 is in substantial abutment with the annular end 14 of shaft 11.

The shaving, or machining, operation is performed by a cutting tool 22 comprising a shaft 23 having fixed at one end thereof a nut 24 with a set of driving surfaces (sometimes called "drive means") and at the other end a hollow cylindrical cutting head 25. The hollow has an internal diameter such that its inner cylindrical surface 26 will fit over and slide in the axial direction along the section 20 of spindle 17. The forward end of the cutting head is provided with cutting teeth 27 designed so that their cutting edges 27a are at the inner circumference of the annulus at which the cutting teeth are formed.

For performing the machining operation the cutting head 25 is placed over a section 20 of the spindle and caused to slide axially in the direction of arrow 28 by a pressure from a spring-like lever 29, exerted against a shoulder 30 of the cutting tool. Provision is made for lever 29 to clear the nut 24 in reaching the shoulder 30. The lever may be a resilient member or strip one end 29a of which may be held by a part 8 attached to body 12, and the opposite end 29b of which may be pushed manually in the direction of arrow 7 as though it were a pry bar. Lever 29 comprises "advance means" to advance the cutter along the work surface. With the cutting tool held in this position on the spindle the cutting head can be rotated relative to the bearing, in the cutting direction indicated by arrow 6, by suitable means such as a socket wrench or the like which may be turned manually. The cutting or machining operation will commence at the end 14 of the bearing 11, and as the rotation continues the cutting head will move axially in the direction of arrow 28 under pressure of spring 29, removing material from the worn surface 11 and leaving a smooth cylindrical surface represented by dot-dash lines 32. The cylindrical surface 32 will be of somewhat smaller diameter than that of the original cylindrical bearing surface 11a, but of greater diameter than the inner surface 13.

The axial movement of the cutting head will continue until stopped by the rear wall 33 of the hollow of the cutting tool coming into abutment with the end wall 34 (sometimes called "limit means") of the spindle, at which position the cutting tool cannot be advanced any further in the directin of arrow 28. This abutting of surfaces 33 and 34 thus terminates the cutting operation. The relative lengths of spindle section 20 and the distance between surface 33 and the cutting edges 27a are selected so that the axial advance of the cutting head is stopped at the position where the removal of the worn bearing surface material has been completed.

When the cutting operation has been completed, leaving the machined cylindrical surface of the bearing at line 32, the sleeve 16 is then press-fitted over the cylindrical surface 32, which may be done by a suitable tool in a well-known manner.

In FIGS. 3 through 4 there is illustrated equipment, and a method, for renovating a bearing under the condition that the bearing shaft is hollow from end to end. FIG. 3 illustrates such a shaft 40 which is typical of a type of shaft used in an automatic transmission. The shaft will ordinarily have mounted on it equipment indicated symbolically at 39, which in the case of its incorporation in an automatic transmission system will be part of the automatic transmission equipment. The section of shaft 40 at the left of equipment 39 is shown in FIG. 3 as having a larger diameter than the shaft section 40a at the right of equipment 39, which is in accordance with a common practice. According to conventional practice the shaft is provided with grooves 41 for O-rings and adjacent the O-rings there is the exterior cylindrical bearing surface 43 of the shaft. The internal opening of the hollow shaft has a cylindrical surface 44, on a central longitudinal axis 42, at the bearing end of the shaft, and surface 44 joins and is co-axial with, a cylindrical surface 45 at the other end of the shaft which may be of the same, or somewhat different, diameter from that of surface 44. As explained in connection with the shaft 10 of FIGS. 1 and 2, the bearing surface 43 can become worn with use, which will create wobble in the operation of the equipment.

FIGS. 4 and 5 illustrate a tool which can be used to machine down the worn portion of bearing surface 43 so that a bearing sleeve may be fitted over it after the machining operation. This tool comprises a cutting head shaft 46 to which is attached a cutting head 47 in the form of a hollow cylindrical member having an inner cylindrical surface 48, the annular end 49 of which is provided with cutting teeth 50. The inner edges 50a of the teeth provide the cutting edges. The end 51 of the cutting head opposite end 49 has a plane annular surface 51 surrounding the shaft 46. At the outside surface of end 51 there is formed an extension 52 of the shaft 46 and at the end of this extension there is provided a set of driving surfaces 53 (sometimes called "drive means"), co-axial with the shaft. The end portion 54 of the shaft opposite nut 53 is provided with threads 56.

FIG. 3 illustrates the manner of using the cutting tool of FIG. 4 to reduce the diameter of cylindrical bearing 43 sufficiently to remove the worn areas. The shaft 46 will be inserted from its end 54 through the internal opening 44 of the shaft 40 from the left side, with reference to FIG. 3, so that threaded end 54 of the tool protrudes beyond the right side of the shaft section 40a. Before doing this, however, bushings 57 and 58 are inserted into the opposite hollow ends of the shaft. The bushings 57 and 58 have respective sleeve portions 57a and 58a with external surfaces which fit the internal cylindrical surfaces of the respective end of the bearing shaft, and internal surface through which cutting head shaft 46 will closely fit to slide through the bushings. This arrangement causes the cutting head to be properly centered co-axially with the bearing 43. A helical spring 55 is then placed over the threaded portion 54 as illustrated in FIG. 3. The dimensions of the spring are such that it can pass over the shaft portion 46 and abut against the bushing 58. The other end of the spring abuts a nut 59 when the nut is threaded onto the threads 56. Nut 59 comprises "advance means" which functions to move the cutter along the work surface. This nut will be tightened sufficiently to produce a desired substantial compression of the spring so that its effect will be to pull the cutting tool in the direction of arrow 60 relative to the shaft 40. The diameter of the cutting teeth at their cutting edges 50a is such that the cutting teeth will slide over the left end of shaft 40, as seen in FIG. 3, but will abut the shoulder 61 at the left end of bearing 43. As the cutting edges 50a of the cutting teeth bear against the shoulder 61 they will make a cylindrical cut of somewhat smaller diameter than the original bearing diameter sufficient to move the worn bearing areas, as shown by dotted lines 62, when the cutting tool is rotated in the cutting direction indicated by arrow 63 in FIG. 3. This turning operation may be performed manually if desired by means of a suitable wrench applied to the nut 53. The compression of the spring will cause the cutting tool to advance to the right with reference to FIG. 3 relative to the bearing surface 43 and as the cutting tool advances, the nut 59 may be tightened from time to time to maintain the desired spring compression until the end of the cut. The plane surface 51 of the cutting tool is positioned at the proper distance from the cutting teeth 50 so that when the cutting operation on the bearing surface 43 is completed the surface 51 (sometimes called "limit means") will abut the annular surface 61 of the shaft 40 so that no further advance of the cutting head in the direction of arrow 60 can occur.

When the cutting operation is completed, the cutting tool will be removed from the shaft and a hollow cylindrical bearing sleeve of the same dimensions as the material shown in FIG. 3 as bounded by the lines 61, 62, shoulder 64 and surface 43 will be pressed over the bearing which, until the sleeve is pressed on, has the reduced diameter represented by line 62. The inner and outer diameters of the bearing sleeve are such that the inner diameter makes an interference type fit with the machined diameter 62 and the outer diameter of the sleeve is the same as the original outer diameter of the bearing 43.

FIGS. 6 and 7 illustrate means and method for renovating a worn internal surface bearing. FIGS. 6 and 7 illustrate a structure which may also be considered part of an automatic transmission system. This comprises an outer cylindrical housing 70 having a smaller cylindrical portion 71 at one end thereof. The housing is provided with circumferential lugs 72 for attachment to a support. Within the housing there is hub-like structure 73. A cylindrical opening 75 passes through the housing coaxial with the circumference of the housing, the axis being shown at 74. The minimum diameter of the opening 75 is provided by a bearing, the inner cylindrical surface 76 of which, establishes the minimum diameter of opening 75. After a period of use the inner bearing surface 76 may become worn, causing undesirable wobble of parts.

A cutting tool 77 is used for machining this bearing to a somewhat larger internal diameter than diameter 76, sufficient to eliminate the worn areas. The cutting tool comprises a shaft 78 having fixed to it a cutting head 79 having cutting teeth 80 at one end with cutting edges 80a at the outer cylindrical periphery of the cutting head. Extending from the side of the cutting head 79 opposite that of the cutting teeth there is a shank portion 81 which terminates in a set of driving surfaces 82 (sometimes called "drive means") shown as a hex nut. Pins 83 (sometimes called "limit means") extend outwardly from the shank 81 from opposite sides of the shank periphery. The end of shaft 78 opposite the nut 82 is provided with threads 84 adapted to receive a nut.

To perform the cutting operation on the internal bearing surface, the end of the shaft 78 having the threads 84 is inserted through the bearing 76 from the left side of the housing, with reference to FIG. 6. For the purpose of holding shaft 78 co-axial with the axis 74 there is provided a bushing 87 having an external diameter 88 which matches that of opening 75, and an internal diameter 89 which matches that of shaft 78 so that this shaft can rotate and also slide axially within it. A flange 90 on the bushing abuts the end 91 of the hub. The axial thickness of the bushing is sufficient to maintain the shaft 78 in the coaxial position.

As indicated in FIG. 6, a helical compression spring 85 is placed over shaft 78 from its threaded end so that it abuts the bushing 87. A nut 86 is threaded to the shaft and moved against the other end of the spring sufficient to compress it substantially. The nut 86 comprises "advance means" which tend to advance the cutter along the work surface. This will cause the cutting edges 80a to bear against the end of the bearing which is at the left side, with reference to FIG. 6. When the cutting head is rotated as for example by manual application of a wrench to nut 82 a machining operation will be performed on the bearing along cylindrical lines 92, thereby removing the worn material from the bearing. In FIG. 6 the cutting head is shown as having advanced its complete distance along the bearing from left to right so that actually none of the worn surface portion of the bearing remains. This position of maximum advancement of the cutting head from left to right is established by the position of pins 83 relative to the annular end 93 of the housing. The end 93 of the housing is so dimensioned relative to the position of pins 83 that when the pins come into abutment with end 93 the cutting edges 80 are at the right-hand end of the bearing, with reference to FIG. 6.

When the machining operation is complete, the cutting tool will be withdrawn from the bearing and the material which was removed from the bearing by the cutting tool will now be replaced by a cylindrical bearing sleeve of the same dimensions as those of the removed material thereby returning the bearing to its original dimensions and condition which existed prior to the occurrence of any wear or machining. This bearing sleeve will be press-fitted at the surface 92.

The bearings shown in FIGS. 1 and 2, FIGS. 3, 4 and 5, and FIGS. 6 and 7 represent bearings and their associated parts which are found in a motor vehicle automatic transmission system of the type known as No. 350 of General Motors Corporation. It will be understood, however, that the invention is not limited to use with bearings of this particular automatic transmission system or of any other particular transmission system, or even of any transmission system.

It will be recognized that by the present invention there is provided relatively simple and inexpensive tooling useful for renovating worn cylindrical bearings and that this tooling may be used manually. The advance means can readily be manipulated manually, such as by pressing on lever 29, or by turning nuts 59 and 86. The drive means can be turned by an engaged wrench. Therefore this invention can be used in a shop independently of power tools. Of course a power source could be used to drive the drive means.

It will be understood that the embodiments of the invention illustrated and described herein are given by way of illustration and not of limitation, and that modifications or equivalents or alternatives within the scope of the invention may suggest themselves to those skilled in the art.

I claim:

1. Tooling for removing worn areas from an original cylindrical bearing surface of a bearing mounted on a hollow bearing shaft having a central longitudinal axis, and permitting a sleeve having a cylindrical bearing surface of the same diameter as said original bearing surface to be fitted to said bearing, comprising:
   - a cutting head shaft;
   - means for supporting the cutting head shaft in a position concentric with said axis, said means comprising a portion of the cutting head shaft adapted to rotate and slide axially within the hollow of the bearing shaft;
   - a rotatable cutting head mounted on the cutting head shaft, having cutting edge means which describes a circle when the head is rotated, said circle having a diameter sufficiently different from the diameter of said bearing surface as to make a circular cut into the bearing to a depth which lies beneath the worn areas;
   - drive means by which the cutting head may be rotated;
   - advance means urging said head to move longitudinally relative to the bearing, so that rotation during said urging machines a cylindrical surface on said bearing of a diameter which is that of said circle; and
   - limit means attached to the cutting head to prevent further longitudinal movement of the head after a desired longitudinal length of said last-mentioned cylindrical surface has been achieved, said advance means comprising a compression spring positioned between a member attached to the cutting head shaft and a member to which the bearing is attached;
   - whereby the sleeve having a cylindrical bearing surface of the same diameter as the original bearing surface may be fitted to cover the machined surface of the bearing.

* * * * *